United States Patent [19]

Ogawa et al.

[11] 4,172,054
[45] Oct. 23, 1979

[54] MODELING COMPOSITION FOR CRAFT WORKS AND A METHOD FOR THE PRODUCTION THEREOF

[75] Inventors: Kenyu Ogawa, Machida; Kiyoshi Ochiai, Sagamihara, both of Japan

[73] Assignee: Nippon Flour Mills Co., Ltd., Tokyo, Japan

[21] Appl. No.: 752,994

[22] Filed: Dec. 21, 1976

[30] Foreign Application Priority Data

May 25, 1976 [JP] Japan .................................. 51-60396

[51] Int. Cl.$^2$ .......................... C08L 3/02; C08L 89/00
[52] U.S. Cl. .................................. 260/8; 260/17.4 R; 260/17.4 ST; 260/29.6 R; 260/29.6 H; 260/29.6 BM; 260/29.6 MM
[58] Field of Search ............................. 260/17.4 ST, 8

[56] References Cited

U.S. PATENT DOCUMENTS

| | | | |
|---|---|---|---|
| 3,167,440 | 1/1965 | McVicker et al. | 106/38.5 R |
| 3,767,604 | 10/1973 | Hjermstad et al. | 260/17.4 ST |
| 3,887,940 | 6/1975 | Mangold et al. | 260/17.4 ST |

*Primary Examiner*—Harold D. Anderson
*Attorney, Agent, or Firm*—Russell & Nields

[57] ABSTRACT

This invention relates to an improved modeling composition of a soft pliable, working consistency for being molded into any desired shape and form and is relatively rapid-drying so as to provide preferable handicraft articles having any desired shape or form and colors. A small amount of dibutyl hydroxy-toluene or butyl hydroxy-anisole, or both, is included in a modeling composition which is predominantly starch-bearing material, bread and synthetic latex.

7 Claims, No Drawings

MODELING COMPOSITION FOR CRAFT WORKS AND A METHOD FOR THE PRODUCTION THEREOF

BACKGROUND OF THE INVENTION

Hitherto various kinds of modeling compositions have been known and used particularly for children's play. For instance chlorinated paraffin blended with nitrile rubber; bentonite kneaded with oil; kneaded compounds of clay, japan wax or paraffin and castor oil; plastic modeling compositions comprising synthetic plastic material, etc. have been proposed. All of them, however, had some defect such as the following: viscosity is too variable depending on the environmental temperature; unsanitary because of oil oozability and strong offensive smell; too remarkable variation of hardness depending on the temperature; too high elasticity and lack in plasticity; and inferior releasability from molds used in modeling.

Recently some modeling compositions mainly composed of grain flour such as wheat flour have been proposed. Wheat flour is easily available at a low price and in great quantity and has no poison even when put into the mouth, and in wet condition shows very preferable plasticity and workability: therefore, the previous modeling compositions have now been substantially replaced by modeling compositions of grain flour.

As far as we know, the most conventional modeling composition of grain flour has been disclosed by Noah W. McVicker, et al. in U.S. Pat. No. 3,167,440, patented Jan. 26, 1965. That composition consisted essentially of a mixture formed from about 450 to 550 pounds of grain flour, about 450 to 550 pounds of water, about 1 to 3 gallons of kerosene and about 75 to 200 pounds of a water soluble substantially non-toxic inorganic chlorine salt selected from the group consisting of sodium chloride, sodium hypochlorite, sodium chlorite and potassium chloride; and if desired a small amount of hardening and astringent agent selected from complex aluminum salts, complex chromium salts and ferric salts; and a small amount of drying and preservative agent selected from a group consisting of borax, salicylic acid, sodium benzoate, sorbic acid, sodium and calcium propionate, calcium oxide, colemanite, rasorite and kernite.

The inventors of the present invention have also disclosed two improved modeling compositions of grain flour in Japanese Pat. Nos. 741581 (Publication No. 4317/1974) and 786306 (Publication No. 49571/1974). In the former a heat-treated wheat flour and a straight-chain hydrocarbon normal paraffin having from 10 to 20 carbon atoms are used in order to improve various properties of the composition, and in the latter a deliquescent salt such as magnesium chloride, aluminum chloride, etc., is added to prevent change of the quality of the composition. The product according to the above Japanese patents has almost perfect properties as a modeling composition for children's play and has been provided to the market in large quantity.

This kind of modeling composition, essentially composed of starch-bearing material such as grain flour, is used widely not only for children's play, but also for manufacturing craft works such as flowers and other handicraft articles. In order to be suitable for use in modeling handicraft articles, it is desirable that the composition have a rapid-drying property so as to harden relatively rapidly to a stiff condition, contrary to those for children's play: that is to say, the composition should be rather unreworkable. We previously found (see Japan Pat. No. 775271 [Publication No. 40656/1974]) that this object could be sufficiently attained by combining bread and synthetic latex with the known modeling composition mainly composed of grain flour, and a large quantity of this product has also been put on the market.

SUMMARY OF THE INVENTION

This invention relates to an improvement of said modeling composition for craft articles which is mainly composed of a starch bearing material.

One of the main objects of this invention is to provide a modeling composition which is non-toxic and has sufficient properties to use for modeling craft articles.

Another object of the invention is to provide a modeling composition which is relatively rapid-drying after modeling so as to give durable articles.

Still other important object of the invention is to provide a modeling composition which exhibits any desired color without any discoloration or fadeaway.

These objects can be accomplished by adding a small amount of at least one of dibutyl hydroxy-toluene and abutyl hydroxyanisole to the rapid-drying modeling composition which is mainly composed of starch-bearing material, bread and synthetic latex.

DETAILED DESCRIPTION OF PREFERRED EMBODIMENTS

We found that the conventional rapid-drying modeling composition comprising mainly starch bearing material, bread and synthetic latex, both colored compositions and non-colored compositions, usually exhibited discoloration and fading when it was stored for a relatively long time. If discolored or faded, the commercial value of the product is extremely reduced. Further we determined that said discoloration and fading would be especially accelerated at the high temperatures of summer.

Regarding the reason of said discoloration and fading, the influence of light, oxygen and enzymes can be considered, but the true reason has not been found yet.

In order to confirm the true reason of the discoloration and the fading, we conducted many experiments and found the following facts.

When the rapid-drying modeling composition is processed at normal temperature, the discoloration or fading of the composition cannot be prevented even when light and oxygen are intercepted; and even when enzymes were made inactive by heating the discoloration and fading could not be prevented.

We made preservation tests in the presence of as well as in the absence of light and oxygen at various different temperatures, and found that when the composition was preserved at a temperature of about 5° C., there was hardly any discoloration and fading, regardless of the presence or absence of oxygen or light.

However, since it is impossible in fact to store the rapid-drying modeling composition at such a low temperature of about 5° C., it is anxiously desired to provide a composition which does not discolor or fade when stored at a practical temperature (10° C. to 40° C.).

We searched for a specific substance capable of retarding the discoloration or fading of the rapid-drying modeling composition and found that some kinds of antioxidant are very useful.

Hitherto as antioxidants of foods the following various compounds have been proposed and used: dibutyl hydroxytoluene (BHT), butyl hydroxyanisole (BHA), α-tocopherol, sodium ascorbate, erysorbic acid and guaiacum resin. We found that for the rapid-drying modeling composition, not all of the above-shown antioxidants are effective, but those which are useful are restricted to only a limited number thereof.

Thus we prepared a dough by blending and kneading the following ingredients according to the conventional way:

|  | parts by weight |
|---|---|
| vinyl acetate emulsion (solid 40%) | 100.0 |
| wheat flour | 74.0 |
| bread (crumb) | 39.0 |
| aluminum sulfate | 2.0 |
| purified diatomaceous earth | 7.5 |
| propylene glycol | 1.5 |
| normal paraffin | 1.0 |
| glycerine | 2.0 |
| borax | 0.6 |
| ethyl alcohol | 3.5 |
| potassium sorbinate | 0.9 |
| water | 100.0 |

The dough obtained was divided into seven equal parts. To six of these parts were added respectively BHA, BHT, α-tocopherol, sodium ascorbate, sodium erysorbinate and guaiacum resin in the amount of 0.04% individually. The seven samples were preserved for one month at 35° C. The color of each sample was determined by use of the "Digital Color and Color Difference Meter, Model ND101D" (manufactured by Nihon Denshoku K.K.) and the UCS values of L, a, and b were calculated by the method for specification of color differences defined in Japan Industrial Standard [JIS] Z 8730/1970.

The results are shown in Table 1.

TABLE 1

|  | Antioxidant | Added amount | L | a | b |
|---|---|---|---|---|---|
| Before preservation | control | — | 79.8 | 0.6 | 6.7 |
| After one month | control | — | 74.5 | 0.7 | 14.4 |
|  | BHA | 0.04% | 78.1 | −0.3 | 10.8 |
|  | BHT | 0.04% | 77.3 | −0.3 | 11.5 |
|  | α-tocopherol | 0.04% | 75.2 | 0.5 | 14.1 |
|  | sodium ascorbate | 0.04% | 75.4 | 0.8 | 13.9 |
|  | sodium erysorbinate | 0.04% | 75.9 | 0.7 | 13.3 |
|  | guaiacum resin | 0.04% | 75.3 | 0.8 | 14.0 |

Remarks: L represents brightness; a and b represent color phases. The greater the numerical value of L becomes, the higher brightness is. a shows the degree of red on the (+) side and green on the (−) side, while b shows the degree of yellow on the (+) side and blue on the (−) side.

As clear from Table 1, among α-tocopherol, sodium ascorbate, sodium erysorbinate and guaiacum resin, all of which are generally considered to be effective antioxidants for foods, none showed any effectiveness for preventing oxidation and discoloration of the compositions and only BHA and BHT are quite effective for the rapid-drying modeling composition of the present invention.

The present invention was completed on the basis of the results of the above-mentioned experiments.

The subject matter of the present invention resides in an improved rapid-drying, non-discolorable and non-fading modeling composition for craft articles comprising mainly starch bearing material, bread and synthetic latex and small amounts of conventional additives such as salt-out or astringent agent, filler, wetting and lubricating agent, borax etc. and being in the condition of dough, characterized in that at least one of BHA and BHT is present in an amount which is small but sufficient for preventing discoloration and fading, and an improved process for producing said novel modeling composition.

Various ingredients to be used for preparing the composition of this invention are explained as follows:

Starch bearing material:

It includes starch itself and grain flour such as wheat flour which is mainly composed of starch. Wheat flour containing 70-80% of starch and 6~15% of protein, or a mixture of wheat flour and starch, are preferable. When wheat flour and synthetic latex are mixed and heated to a temperature of about 50° C., the starch in the wheat flour absorbs the water in the synthetic latex so as to swell, and the swelled starch combines with the synthetic latex to give a definite viscosity, elasticity and plasticity to the composition. Further, the protein (gluten) of the wheat flour is modified by the action of a salt-out or astringent agent which is added separately and by heating. The modified gluten intervenes between the synthetic resin and the swollen starch and plays a part in giving viscosity and elasticity to the product. The amount of starch-bearing material to be used in making the composition is preferably from 55 to 75 parts based on 100 parts by weight of synthetic latex. If the amount of the starch bearing material is more than 75 parts the product loses elasticity, while if the amount is less than 55 parts the above-mentioned functions of the starch-bearing material cannot be attained.

Synthetic latex:

Synthetic latex which is used in the modeling composition of the present invention must be non-toxic, must not have an offensive nor an irritating smell, and must not cause chapped skin, because the composition will come in direct contact with human hands. Further, it is desirable that the composition be white in color, long-lasting and inexpensive. By reason of this, polyvinyl acetate emulsion or polyvinyl alcohol solution are desirable synthetic latices which can be used in the present invention, because they are non-toxic to the human body and give suitable workability of modeling composition without sticking to the hand when they are mixed with other components of the composition of this invention.

Polyvinyl acetate emulsion is the most suitable one.

The synthetic latex of this invention operates so as to cause the formed article to dry rapidly in air to provide a hardened product. The water included in the latex will swell the starch of the grain flour and acts as a desirable distributor of various additives of the composition. The concentration of the synthetic latex may be preferably from about 30% to 60% solid content. If lower-concentrate latex is used, the prepared dough loses elasticity, while when the more concentrated latex was used, the dough showed a tendency to crumble to pieces.

Bread:

Bread is usually prepared by blending wheat flour, enzyme and other additives with water to make dough, fermenting the dough to make a porous body and then baking it. Bread crumbs have a porous structure composed of α-starch and thermally modified and solidified gluten. The crumb has the characteristic of absorbing water like a sponge. When broken pieces of bread are blended in a mixture of synthetic latex and starch-bearing material such as wheat flour, the composition will have suitable elasticity by virtue of the spongy structure of the bread crumbs.

The amount of the bread to be compounded is preferably from 35 parts to 55 parts by weight based on 100 parts by weight of the synthetic latex. If more bread is used, the molded product will be bent and distorted due to excessive shrinkage when air-dried. On the other hand, if less bread is used, the produced article will not have suitable elasticity.

Salt-out or astringent agent:

As the salt-out agent or astringent agent, inorganic compounds such as aluminum sulfate, potassium sulfate, sodium sulfate, sodium chloride and alum can be used.

The salt-out agent or astringent agent acts to increase the gellation temperature of the starch, thereby to prevent swelling and rupture of the cells of the starch so that a tendency of the composition to become too sticky is suitably avoided, and also acts on the protein in the grain flour thereby to change stickiness to plasticity.

The amount of this agent is desirably from 1 to 2 parts by weight based on 100 parts by weight of synthetic latex. In the case of a lesser amount of this agent, the above-mentioned effects cannot be attained, while in the case of too great an amount, handling the finished product results in chapped hands and further some crystals are separated on the surface of the modeled product.

Wetting and lubricating agent:

One or more of the following can be used as this agent: propylene glycol, glycerine, paraffin, sorbitol, vegetable oil, mineral oil, lecithin, glycerol ester of aliphatic acid, sucrose ester of aliphatic acid, propylene glycol ester, etc.

This agent acts to prevent the dough from becoming sticky and to give softness and smoothness to the dough. Other functions of this ingredient are to facilitate separation of the molded article from the mold, and to reduce the freezing point of the water in the dough, thereby to prevent modification of the resin in the dough due to refrigeration.

Further this ingredient acts to regulate the drying speed of the dough in relation to the synthetic latex and thereby prevents cracks from forming in the product due to premature solidification.

The amount of the wetting and lubricating agent is preferably from 3 parts to 6 parts based on 100 parts by weight of the synthetic latex to be used. In the case of a greater amount, the dough would lose elasticity and preservability is reduced and the dough would become soft and clammy. On the other hand, in the case of a lesser amount, the dough clings to the hands of the worker and is difficult to remove, and moreover suppleness of the composition will be lost, thereby reducing workability.

Fillers:

The filler to be used in the present composition must be non-toxic, in the form of a fine powder and have a strong ability to retain water. Diatomaceous earth, talc and clay can be employed. The filler acts to maintain physical properties of the dough in stable condition by absorbing any water which has been separated from the aged starch. Further the filler which has been evenly distributed in the dough gives to the dough clay-like physical properties, and at the same time acts to adsorb and maintain many inorganic and organic molecules on the surface of the dough which is of indeterminate shape.

It is desirable that from 5 parts to 8 parts of the filler be used based on 100 parts by weight of the synthetic resin. In the case of a lesser amount, the above-described functions and effects cannot be obtained, while in the case of a greater amount, the dough becomes too brittle to be processed.

Borax:

The synthetic latex of polyvinylacetate contains usually polyvinyl alcohol as an emulsifying stabilizer. Therefor each of synthetic latex of polyvinyl acetate emulsion and polyvinyl alcohol contains polyvinyl alcohol. Borax has such a function that it makes cross-linkage with polyvinyl alcohol and starch to improve the coherence of the dough and thereby improve the workability of the dough.

Borax increases the gellation temperature of the starch and thus prevents particles of starch from losing amylose; thereby to maintain the dough in non-sticky condition and improve the preservability of the dough obtained.

The amount of borax is preferably from 0.1 parts to 1.0 part based on 100 parts by weight of the synthetic latex. In the case of a lesser amount the above-mentioned functions cannot be attained, and in the case of a greater amount the elasticity of the dough becomes too high and the plasticity and workability of the dough would be lost.

Anti-discoloring and anti-fading agent:

It has already been explained in detail that BHA and BHT can give remarkable results as an anti-discoloration and anti-fading agent in the present invention.

BHA and BHT are very effective for preventing dough from discoloring and fading and from smell generation even though each of them is used alone or together. It was found that the suitable amount of BHA or BHT is from 0.04% to 0.4% by weight based on the weight of the dough.

We have obtained the results shown in Table II, by adding 0.004%, 0.04% and 0.4% by weight of BHA or BHT separately into the same composition that was used in the specification of color differences in Table 1, and carrying out the same method for the observation that was employed in Table 1, and measuring L, a and b.

TABLE II

| Antioxidant | Amount, % | L | a | b |
| --- | --- | --- | --- | --- |
| control | — | 74.5 | 0.7 | 14.4 |
| | 0.4 | 76.3 | −0.3 | 12.5 |
| BHA | 0.04 | 78.3 | −0.3 | 10.8 |
| | 0.004 | 76.0 | 0.5 | 13.9 |
| | 0.4 | 76.4 | 0.1 | 12.1 |
| BHT | 0.04 | 77.3 | −0.3 | 11.5 |
| | 0.004 | 75.8 | 0.4 | 13.3 |

As is clear from Table II, the most suitable amount of BHA and BHT is 0.04% to 0.4% of the total weight of the dough in both cases. When a lesser or greater amount is used, desirable results could not be obtained.

Other additives:

Any kind of additive (such as coloring matter, antiseptics, accelerating agents for dissolution and dispersion, which have been used in the conventional modeling compositions comprising starch-bearing material such as wheat flour, can be used. Alcohol is particularly desirable as a dissolution accelerating agent.

Any coloring matter or antiseptic which has been allowed to be added into foods may be used in an amount within the permitted range.

Any suitable alcohol can be used as the dissolving and dispersing agent, but ethyl alcohol is particularly desirable, because it has low toxicity and is readily available.

Alcohol has not only the function of dissolving and dispersing each component homogeneously when the components are blended by a mixer, but also other functions of making the blending operation smooth and of accelerating the drying of modeled articles.

The amount of alcohol to be added is preferably from 3 parts to 6 parts based on 100 parts by weight of the synthetic latex. This amount may be variable depending on the blending period, but too great an amount tends to damage the workability.

Rapid-drying modeling compositions for craft works of the present invention are composed of the above-mentioned components and are characterized by being in the condition of dough.

Accordingly, the modeling composition of the present invention can be produced by blending the avovementioned additives with the main raw materials consisting of synthetic latex, bread and starch-bearing material for several minutes at such an elevated temperature that starch is half gelatinized and the contained gluten is modified. Blending is carried out by putting the above-mentioned components into, for example, a mixer provided with a jacket which was kept heated at 70°-100° C. The temperature of the jacket at time of blending should be kept at an appropriate one. It is desirable to adjust the temperature of the kneaded dough at higher than 50° C. or so.

The stirring period and the stirring speed may be changed according to the capacity and efficiency of the jacket. They have a relation to the temperature of the jacket, too. In short, it is desirable that a proper period and a proper speed should be selected in order to blend components homogeneously and to carry out evenly the reaction of synthetic latex with various kinds of components, especially borax, and the reaction of starch with various kinds of components, especially borax and BHA or BHT, to give a uniform structure. Attention should be paid to the fact that water and alcohol will be vaporized to harden the dough into pieces, if the compound is stirred for a too long period of time. In case that it is difficult to blend uniformly the compounded ingredients, it is desirable to take the mixture out of the mixer after it has been blended once, to let it stand while preventing evaporation of water, and then to put it in the mixer again.

The present invention will be explained further in detail by the following examples.

EXAMPLES 1~2:

Raw materials were prepared as shown in compounding Examples 1 and 2

| Compounding Example 1. | compounded amount (g) | weight ratio |
|---|---|---|
| vinyl acetate emulsion (solid 40%) | 1000 g | 100.0 |
| soft wheat flour | 740 | 74.0 |
| bread crumbs | 390 | 39.0 |
| aluminum sulfate | 20 | 2.0 |
| purified diatomaceous earth | 75 | 7.5 |

| Compounding Example 1. | compounded amount (g) | weight ratio |
|---|---|---|
| propylene glycol | 15 | 1.5 |
| normal paraffin | 10 | 1.0 |
| glycerine | 20 | 2.0 |
| borax | 6 | 0.6 |
| ethyl alcohol | 35 | 3.5 |
| potassium sorbinate | 9 | 0.9 |
| BHA | 1 | 0.1 |

| Compounding Example 2. | compounded amount (g) | weight ratio |
|---|---|---|
| vinyl acetate emulsion (solid 40%) | 1000 | 100.0 |
| middle wheat flour | 660 | 66.0 |
| bread crumbs | 540 | 54.0 |
| aluminum sulfate | 20 | 2.0 |
| purified diatomaceous earth | 55 | 5.5 |
| propylene glycol | 15 | 1.5 |
| liquid paraffin | 10 | 1.0 |
| glycerine | 15 | 1.5 |
| borax | 6 | 0.6 |
| ethyl alcohol | 30 | 3.0 |
| potassium sorbinate | 9 | 0.9 |
| BHT | 1 | 0.1 |
| propylene glycol monoester | 1 | 0.1 |

Into a mixer provided with a jacket which was kept at 85° C. were placed the raw materials of the compositions shown in the above-mentioned Examples, except for the wetting agents and lubricants. The materials were blended for about one minute and then the wetting and lubricating agents were added thereto. The materials were stirred further for three minutes. The temperature of the kneaded dough was adjusted at 50° C. When the dough was heated up to this temperature and blended well, the dough was swiftly taken out of the mixer, then molded into any desired shape and wrapped with a vinyl sheet, and stored in air. Excellent modeling compositions for craft works were thus obtained, which had excellent moldability, stability and rapid drying ability so as to be hardened in the molded condition almost in a day after being molded. Even after a long time the product was hardly discolored or faded.

As is clear from the above explanation, the discoloration and fading of the rapid-drying modeling composition for craft works of the present invention are extremely slight in comparison with those of conventional modeling compositions, and it has good preservability. Moreover, the main components of the composition are starch or starch-bearing material, bread and synthetic latex, which has been used for preparation of chewing gum (e.g., vinyl acetate emulsion). All of the other compositions to be used are selected from conventional admitted additives for foods. Therefore, even though it is taken into mouth by mistake, it will not be toxic. Moreover, the composition of the present invention has high workabilities such as shape-maintaining ability, mold-releasing ability and moldability. The composition has such affinity for coloring matters and pigments that the composition can be freely colored to desired colors. As mentioned above, the composition of the present invention is quite a useful material for various craft works, from big figures to little artificial flowers, brooches, etc. Articles which were made of this composition and dried have moderate flexibility and are difficult to break. Moreover, the products made with the composition of the present invention are extremely charming and it is quite cheap. The composition of the present invention has many advantages as stated above.

Having thus described the principles of the invention together with illustrative embodiments thereof, it is to be understood that although specific terms are employed they are used in a generic and descriptive sense and not for purposes of limitation, the scope of the invention being set forth in the following claims.

We claim:

1. A smooth and velvety modeling composition especially adapted for handicraft articles which is soft, pliable, non-sticky, non-toxic and rapid-drying consisting essentially of a mixture having the consistency of dough and formed from at least one material selected from the group consisting of starch and grain flour which is mainly composed of starch, non-toxic synthetic latex having no offensive or irritating smell and which does not cause chapped skin, and bread crumbs having a porous structure composed of $\alpha$-starch and thermally modified and solidified gluten, and containing, in addition to small amounts of astringent agent adapted to increase the gellation temperature of the starch, filler, wetting and lubricating agent, borax and other conventional additives, at least one anti-discoloring and anti-fading agent selected from the group consisting of dibutyl hydroxy toluene and butyl hydroxy-anisole.

2. A composition according to claim 1 wherein the total amount of said anti-discoloring and anti-fading agent is from 0.04% to 0.4% by weight of the total weight of said mixture, said synthetic latex being selected from the group consisting of polyvinyl acetate emulsion and polyvinyl alcohol solution.

3. A composition according to claim 1 consisting essentially of a mixture by weight of 100 parts of non-toxic synthetic latex having no offensive or irritating smell and which does not cause chapped skin, 55 to 75 parts of at least one material selected from the group consisting of starch and grain flour which is mainly composed of starch, 35 to 55 parts of bread crumbs having a porous structure composed of $\alpha$-starch and thermally modified and solidified gluten, 1 to 2 parts of astringent agent adapted to increase the gellation temperature of the starch, 3 to 6 parts of wetting and lubricating agent, 5 to 8 parts of filler, 0.1 to 1.0 parts of borax and 0.04% to 0.4% by weight of anti-discoloring and anti-fading agent based on the total weight of said mixture and small amounts of other conventional additives.

4. A process of manufacturing a composition of matter which is soft, pliable, non-sticky, non-toxic and rapid-drying and especially adapted for handicraft articles, said process including the steps of mixing together by weight 100 parts of non-toxic synthetic latex having no offensive or irritating smell and which does not cause chapped skin, 55 to 75 parts of at least one material selected from the group consisting of starch and grain flour which is mainly composed of starch, 35 to 55 parts bread crumbs having a porous structure composed of $\alpha$-starch and thermally modified and solidified gluten, 1 to 2 parts astringent agent adapted to increase the gellation temperature of the starch, 3 to 6 parts wetting and lubricating agent, 5 to 8 parts filler, 0.1 to 1.0 parts of borax and 0.04% to 0.4% by weight of anti-discoloring and anti-fading agent based on the total weight of said mixture and small amounts of other conventional additives and continuing the blending of the mixture while regulating the temperature of the blended composition so that it rises up to about 50° C.

5. A composition according to claim 1 wherein said grain flour is wheat flour.

6. A composition according to claim 3 wherein said grain flour is wheat flour.

7. A process according to claim 4 wherein said grain flour is wheat flour.

* * * * *